Patented Oct. 20, 1936

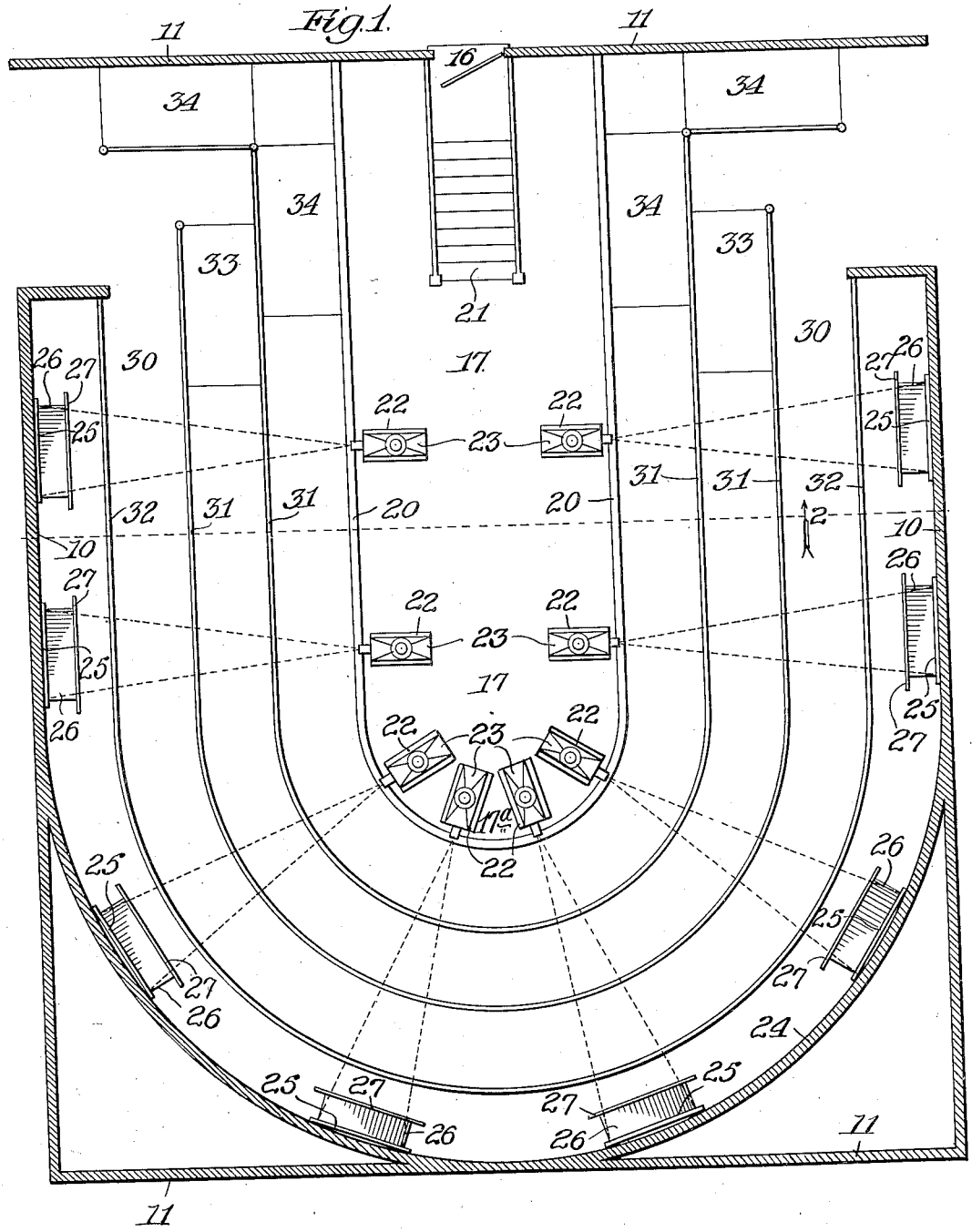

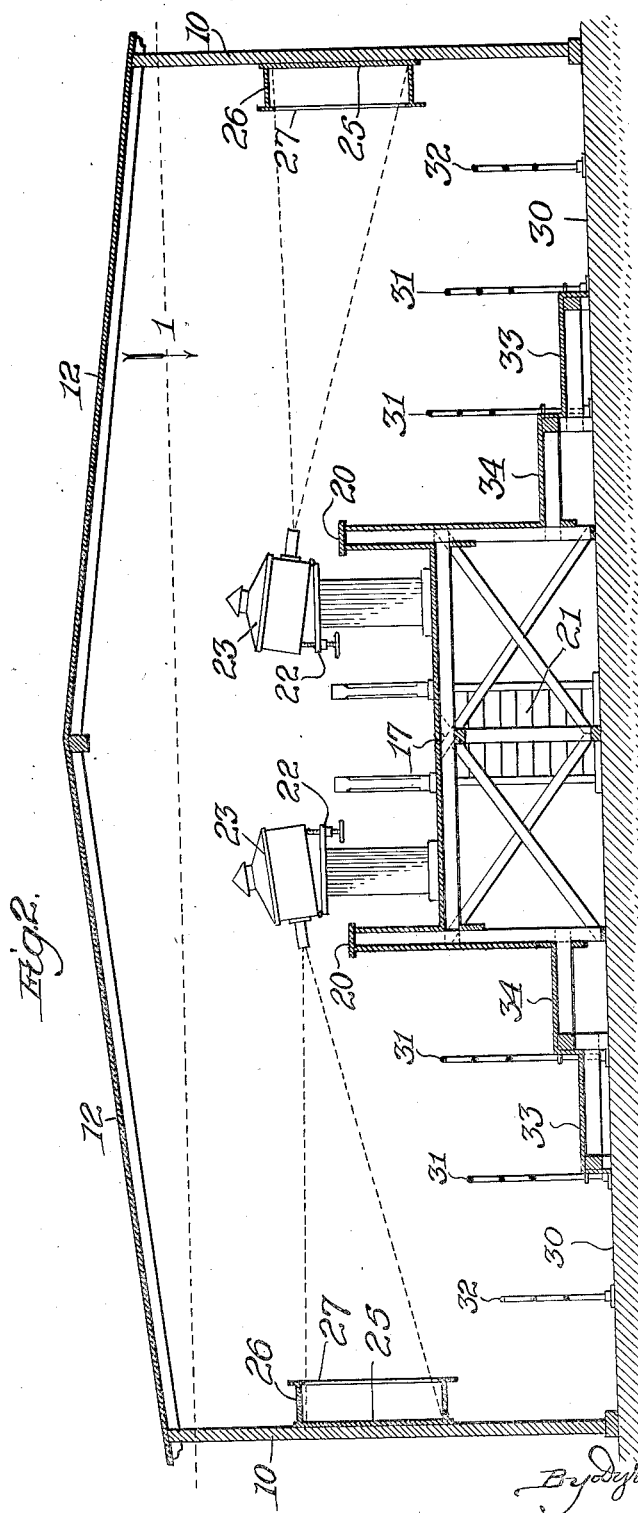

2,058,179

UNITED STATES PATENT OFFICE 2,058,179

APPARATUS FOR MICROSCOPIC PROJECTIONS

Georg Römmert, Chicago, Ill.

Application April 29, 1935, Serial No. 18,946

12 Claims. (Cl. 20—1.12)

This invention relates to improvements in projection apparatus and, more especially, to such apparatus adapted for projecting stereopticon images or views on screens. The invention is more particularly applicable for use in connection with the projection of microscopic images, or enlarged images or views of microscopic animals or other objects.

Among the features of my invention is the provision of apparatus including screens, enclosure and the like, permitting the magnification of living animals of microscopic size and the enlargement and projection of images thereof by means of light on a screen. My improved apparatus permits the simultaneous operation of a plurality of projectors so arranged that they can be operated and attended by one or relatively few operators. The arrangement is such that one operator, for example, may take care of two or more projectors and pass back and forth from one to the other without interfering with the views projected by the same on screens. Means are also provided to permit spectators to view the various screens with little or no interference. To this end, I provide a plurality of parallel aisles at different elevations so that spectators standing in one aisle will not interfere with the view of those in another aisle. The aisles are also so arranged that any spectator entering one aisle, by merely passing throughout its length, will be able to view all the screens in one exhibit.

Other features and advantages of my invention will appear more fully as I proceed with my specification.

In that form of device embodying the features of my invention shown in the accompanying drawings—

Figure 1 is a plan view; and Fig. 2 is a sectional view.

As shown in the drawings, the apparatus may include a plurality of side walls 10, 10, and end walls 11, 11, to provide a suitable unit of space which may be in the form of a room or enclosure, said space being provided with a suitable ceiling 12 and floor 13. Suitable openings are provided, as indicated by 14 and 15, to provide an entrance and exit for spectators. There may also be a separate entrance 16 for operators, to be explained more in detail hereinafter.

17 indicates an elongated raised platform substantially centrally arranged and provided with a curved end 17ª. Such platform, for example, may be at an elevation of substantially five feet above the floor level 13. The platform is mounted on suitable supports or posts 18, 18, strengthened by braces 19. The platform 17 is surrounded by a solid wall or rail 20 about three feet high. 21 indicates a flight of steps leading from the operators' door 16 to the platform to permit entrance and exit of operators to and from the platform without interfering with spectators in the enclosure.

22, 22, indicate stands or tables on the platform 17 adjacent the wall 20 adapted to support projectors or projecting apparatus 23. Such apparatus may be of any conventional form in the nature of stereopticon lanterns. For example, such projectors may be arranged in connection with microscopes in a well-known manner to project enlarged images of microscopic objects.

The projectors 23 are arranged on the platform adjacent its periphery to project divergent beams therefrom to cast images on screens in front of said projectors. The walls 10, 10 at the sides are parallel with the side edges of the platform 17; but where the platform is curved at one end, as indicated by 17ª, the walls 10, 10 are curved to parallel the same, as indicated by 24. In other words, the construction is such as to provide a wall space from the periphery of the platform and substantially parallel therewith.

Mounted on the wall 10 or 24 opposite each projector 23 is a circular screen 25 surrounded by a cylindrical shading rim or flange 26, said flange being provided at its inner edge with a flaring flange 27. The flanges 26 and 27 operate to prevent undue dispersion or reflection of light from the screen and thus lessen interference between the various projectors.

Between the periphery of the platform 17 and the walls 10 and 24 is provided a plurality of parallel aisles here indicated as 28, 29 and 30, in order from the platform 17 outwardly. These aisles are at different elevations, the inner one 28 being the highest, for example, substantially twenty inches above floor level. Aisle 29 may be ten inches above floor level and aisle 30 may be at floor level. Between adjacent aisles I provide rails 31, 31, to prevent danger of a misstep from one aisle to another which otherwise might happen, considering that the entire enclosure is substantially in darkness during the projection of images by the projectors. Outside of the lowest aisle 30 there may also be provided a similar rail 32 to prevent spectators from moving too close to the screens. The separation of the aisles also prevents undue crowding and facilitates passage of spectators through the entire exhibit so that anyone entering one aisle and passing through the same will see the entire exhibit. 33, 33 indicate ramps at the ends of aisle 29, which may be entrance and exit ramps. Likewise, 34, 34 indicate similar ramps for aisle 28.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. Projection apparatus, including; an elevated platform; a plurality of projectors on said platform adjacent its periphery and adapted to project divergent beams therefrom; a wall adjacent but spaced from the periphery of said platform; a plurality of screens on said wall adapted to receive images projected by said projectors; and a plurality of parallel aisles between the periphery of the platform and the wall, said aisles being at different levels, the highest being adjacent the periphery of the platform and decreasing in height outwardly toward the wall, said aisles being so constructed and arranged that spectators may enter at one end thereof and pass along said aisles, viewing said images during said passage without substantial interference from other spectators.

2. Projection apparatus, including; an elevated platform with at least a portion of its periphery curved; a plurality of projectors on said platform adapted to project beams diverging radially from its curved periphery; a curved wall adjacent but spaced from the curved periphery of said platform and substantially parallel therewith; a plurality of screens on said wall adapted to receive images projected by said projectors; and a plurality of parallel aisles between the periphery of the platform and the wall, said aisles being at different levels, the highest being adjacent the periphery of the platform and decreasing in height outwardly toward the wall, said aisles being so constructed and arranged that spectators may enter at one end thereof and pass along said aisles, viewing said images during said passage without substantial interference from other spectators.

3. Apparatus as claimed in claim 1, provided with rails separating the aisles.

4. Apparatus as claimed in claim 2, provided with rails separating the aisles.

5. Apparatus as claimed in claim 1, in which the ends of the elevated aisles are provided with entrance and exit ramps.

6. Apparatus as claimed in claim 2, in which the ends of the elevated aisles are provided with entrance and exit ramps.

7. Apparatus as claimed in claim 1, provided with rails separating the aisles and entrance and exit ramps at the ends of the elevated aisles.

8. Apparatus as claimed in claim 2, provided with rails separating the aisles and entrance and exit ramps at the ends of the elevated aisles.

9. Projection apparatus, including; a substantially rectangular elevated platform with one end curved; a plurality of projectors on said platform adjacent its periphery and adapted to project divergent beams therefrom; a wall around the sides and curved end of said platform and substantially parallel with and adjacent but spaced from the periphery thereof; a plurality of screens on said wall adapted to receive images projected by said projectors; and a plurality of parallel aisles between the periphery of the platform and the wall, said aisles being at different levels, the highest being adjacent the periphery of the platform and decreasing in height outwardly toward the wall, said aisles being so constructed and arranged that spectators may enter at one end thereof and pass along said aisles, viewing said images during said passage without substantial interference from other spectators.

10. Apparatus as claimed in claim 9, provided with rails separating the aisles.

11. Apparatus as claimed in claim 9, in which the ends of the elevated aisles are provided with entrance and exit ramps.

12. Apparatus as claimed in claim 9, provided with rails separating the aisles and entrance and exit ramps at the ends of the elevated aisles.

GEORG RÖMMERT.